Jan. 18, 1927.
J. A. COATS
1,614,827
AUXILIARY LENS FOR EYEGLASSES
Filed June 11, 1925
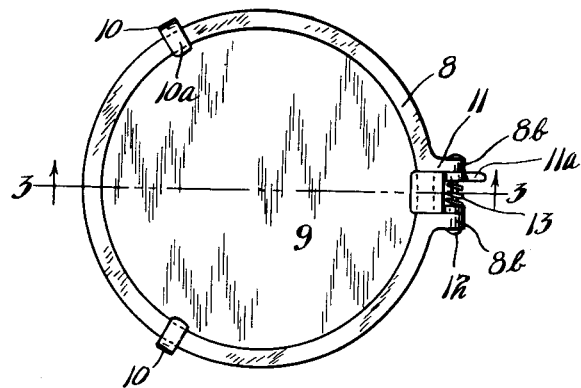
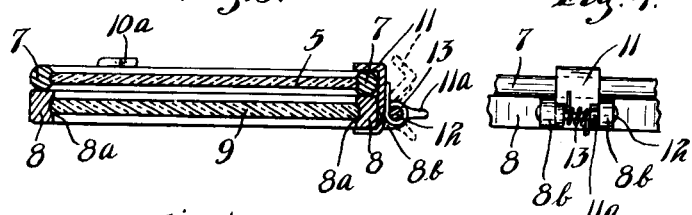 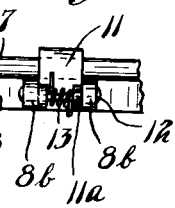
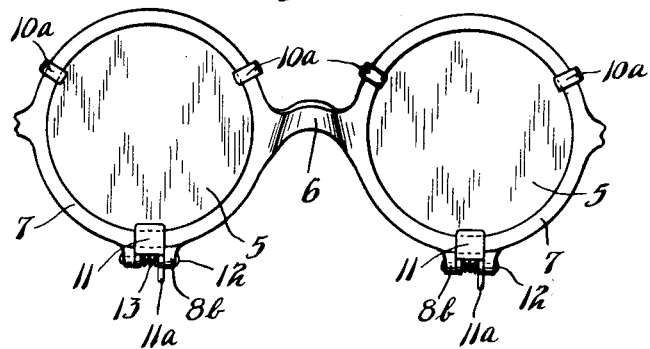
INVENTOR.
JOHN A. COATS.
BY HIS ATTORNEYS.
Williamson Reif Williamson Patented Jan. 18, 1927.

1,614,827

UNITED STATES PATENT OFFICE.

JOHN A. COATS, OF REMER, MINNESOTA.

AUXILIARY LENS FOR EYEGLASSES.

Application filed June 11, 1925. Serial No. 36,375.

This invention relates to detachable auxiliary flanges for standard eye-glasses to be used as sun or glare shields or for the treatment of certain infections of the eyes.

The invention is especially adapted for use in driving motor vehicles against a bright sun or the glare of approaching motor vehicles, at night. For the person who wears eye-glasses, it is not only cumbersome to wear an extra set of opaque or black glasses to prevent glare, but it is, moreover, exceedingly uncomfortable, while, if the person removes the standard glasses and substitutes a pair of opaque glasses, he is unable to see with any degree of accuracy. Likewise, in the case where the person has an infection in his eyes, requiring the use of dark glasses as well as his regular glasses, he must either have special dark glasses made with lenses of the same prescription as his regular glasses or else must be annoyed by the two pairs of glasses, as above described.

This invention has for its object to provide an exceedingly simple but highly efficient non-glare attachment for standard eyeglasses comprising independent opaque lenses adapted to be readily attached or detached over the lenses of the eye-glasses.

It is a further object of the invention to provide such an attachement which will be sightly and compact, being disposed out of the way and insuring comfort to the wearer.

It is a more specific object of the invention to provide a detachable auxiliary lens having circumferentially spaced securing clips, one of which is pivoted and resiliently impelled to clamping position, thereby enabling the wearer to speedily attach or detach the auxiliary independent lens to the frame or rims of his standard eye-glasses.

These and other objects of the invention will be apparent from the following description made in connection with the accompanying drawings, wherein like characters refer to similar parts throughout the several views, and in which—

Fig. 1 is a front elevation of the main part of a pair of spectacles or eye-glasses showing a preferred form of the invention attached thereto;

Fig. 2 is a front elevation on an enlarged scale of one of the auxiliary lenses detached;

Fig. 3 is a horizontal cross section taken on the line 3—3 of Fig. 2, showing the auxiliary lens attached to the lens of a standard pair of eye-glasses; and Fig. 4 is a fragmentary end elevation of the same, showing the specific structure of the pivoted clip.

In the drawings, a standard pair of eyeglasses or spectacles are illustrated having the usual lenses 5, the nose bridge 6, and the lens frames 7. The invention comprises a pair of auxiliary lenses having the frame 8 with a concave track 8$^a$ on the inner edge thereof, in which the opaque pane or lens 9 is adapted to be seated. Circumferentially spaced about the outer edge of the frame 8, are a plurality of attaching clips 10 and 11, respectively. In the preferred form of the invention illustrated, the clips 10 comprise rigidly mounted inwardly bent members having the securing flanges 10$^a$. The movable clip 11 comprises a similar shaped member pivoted in small bearings 8$^b$ afforded by a portion of the frame by means of the pin 12. A small coiled spring 13 is mounted on pivot pin 12 having one of its ends engaging the flat side surface of the clip 11 and having its other end engaging against the edge of frame 8, thereby resiliently impelling the clip 11 downwardly into clamping position. Clip 11 is also provided with the relatively small lever arm 11$^a$ for more readily releasing the same.

As shown in Figs. 1 and 2, the auxiliary lenses may be readily attached over the standard lenses of the eye-glasses by pressing the clip 11 outwardly, slipping the rigid clips 10 over the sides of the lenses or frames of the eye-glasses and releasing the clip 11, permitting the same to clamp against the opposite side of said lenses or frame. The auxiliary lenses may obviously be readily detached by releasing the pivoted clip and slipping the auxiliary lens off the lenses or frame of the eye-glasses.

Panes of different density may be obviously used in the auxiliary lenses, as well as actual prescription lenses adapted to correct certain weaknesses of the particular wearer's eyes. The auxiliary lenses may be easily carried on the person of the wearer and be quickly placed in operative position upon the standard eye-glasses.

It will be seen from the foregoing description that the applicant has invented an extremely simple but highly efficient device comprising few parts and capable of wide general usage.

Extensive actual usage has shown the device to be successful for all purposes intended.

It, of course, will be understood that various changes may be made in the form, details, proportions and arrangement of parts without departing from the scope of the invention.

What is claimed is:—

1. An attachment for eye-glasses comprising a pair of auxiliary lenses adapted to be disposed over the lenses of a pair of eye-glasses and means for attaching said auxiliary lenses, including swingable clamping members pivoted adjacent the peripheral edges of said auxiliary lenses normally impelled inwardly to engage the edges of the lenses or the frame of a pair of eye-glasses.

2. An auxiliary lens for eye-glasses comprising a relatively thin pane, means adjacent the peripheral edge of said pane for attaching the same to a lens or the frame of a pair of eye-glasses, said means including a swingable clamping member and means for impelling said clamping member inwardly against said pane.

3. An attachment for eye-glasses having in combination a pair of independent auxiliary panes each adapted to be secured over one of the lenses on a pair of eye-glasses, means on each of said auxiliary panes for engaging portions of the lens or frame of said pair of eye-glasses and a clamping lever on each of said panes normally impelled inwardly and adapted to secure said panes to said eye-glass members.

4. An auxiliary lens for eye-glasses comprising a relatively thin pane, means adjacent the peripheral edge of said pane adapted to engage a portion of the peripheral edge of a lens or frame of a pair of eye-glasses, a clamping lever pivoted adjacent the peripheral edge of said pane and having a projecting manipulating arm and means for resiliently holding said lever inwardly.

In testimony whereof I affix my signature.

JOHN A. COATS.